US005416883A

United States Patent [19]
Hakoun et al.

[11] Patent Number: 5,416,883
[45] Date of Patent: May 16, 1995

[54] CLAMP FOR RETAINING AT LEAST ONE OPTICAL FIBER

[75] Inventors: Roland Hakoun, Domont; Michel Reslinger, Bondoufle; Gérard Godard, Noiseau, all of France

[73] Assignee: Mars Actel, Vrigne aux Bois, France

[21] Appl. No.: 155,702

[22] Filed: Nov. 23, 1993

[30] Foreign Application Priority Data

Nov. 25, 1992 [FR] France .................. 92 14169

[51] Int. Cl.⁶ .............................................. G02B 6/44
[52] U.S. Cl. ...................................... 385/136; 385/137
[58] Field of Search .................. 385/53, 54, 55, 56, 385/58, 59, 70, 71, 75, 76, 77, 136, 137

[56] References Cited

U.S. PATENT DOCUMENTS

| | | | |
|---|---|---|---|
| 3,919,037 | 11/1975 | Miller | 156/502 |
| 4,029,390 | 6/1977 | Chinnock et al. | 385/137 |
| 4,057,448 | 11/1977 | Miller | 156/158 |
| 4,973,126 | 11/1990 | Degani et al. | 385/55 |
| 5,323,481 | 6/1994 | Tokumaru et al. | 385/136 |

FOREIGN PATENT DOCUMENTS 0122169 10/1984 European Pat. Off. ........ G02B 7/26
4031451 4/1992 Germany ...................... G02B 6/24

OTHER PUBLICATIONS

Abstract of New Technology from the Air Force Systems Command, NTN-78/0446, 1978, R. J. Morrison: "Optical Fiber Holding Clamp" (no month available).

*Primary Examiner*—Frank Gonzalez
*Attorney, Agent, or Firm*—Sughrue, Mion, Zinn, Macpeak & Seas

[57] ABSTRACT

The clamp includes a body having a grooved plane surface, facing which a clamping jaw is pivotally mounted. The body is constituted by an elongate flat support having a top plane face provided with a recess, and by a plate which is complementary to the recess, which is grooved so that it can receive one or more fibers, and which is removably mounted in the recess in the support. Application: tool for handling optical fibers.

14 Claims, 2 Drawing Sheets

CLAMP FOR RETAINING AT LEAST ONE OPTICAL FIBER

The present invention relates to a clamp for retaining at least one optical fiber, for the purposes of stripping, cutting, welding, or otherwise working on each fiber retained by the clamp.

BACKGROUND OF THE INVENTION

Document FR-A-2,590,959 describes a device for gripping an optical fiber. That device is constituted by a body and a clamping jaw, and it has an overall shape that is suitable for it to be held in a system having a cylindrical clamping chuck or three jaws at 120° engaging the periphery of the body.

In that known device, the body has two parallel and opposite side flats. A first one of the flats defines a plane surface provided with a rectilinear groove in which the sheathed fiber can be positioned. The fiber installed in the groove remains proud relative to the plane surface of the first flat. The jaw is pivotally mounted to rotate about a pin that is parallel to the groove, which pin secures the jaw to the body, and enables the jaw to be put either in the open position or in the closed position against the first flat. The jaw itself has a plane abutment surface that bears resiliently against the sheathed fiber installed in the groove, when the Jaw is in the closed position. The resilience is provided by the jaw having a slot in the vicinity of the abutment surface so that said abutment surface can be deformed. When that jaw is in the closed position, its abutment surface is not parallel to the grooved plane surface of the body, and it is not possible for a plurality of fibers disposed side-by-side to be retained thereby.

That device further includes means for opening the jaw, which means are constituted by springs working in compression. That device also includes locking means for locking the jaw in a limited open position, and in a closed position, the limited open position being just sufficient to enable the sheathed fiber to be passed and installed in the groove. Those locking means are relatively complex. They are situated against the second flat and are difficult to access.

OBJECTS AND SUMMARY OF THE INVENTION

An object of the present invention is to simplify that known device considerably, and, in addition, to make it possible to retain either a single sheathed fiber or a layer comprising a plurality of sheathed fibers, as required.

The invention provides a clamp for retaining at least one optical fiber, said clamp including a body, a grooved plane surface on said body for positioning each sheathed optical fiber, a clamping jaw pivotally mounted on said body parallel to each groove to pivot between an open position relative to said grooved plane surface and a closed position against said grooved plane surface, locking means for locking said jaw in the closed position, and associated unlocking means, wherein said body is formed by an elongate "flat" support having a top plane face provided with a recess, and by a plate which is complementary to said recess, which is removably mounted in said recess, and which has at least one groove on that one of its faces which fits flush with said top face of said support, which groove(s) is/are adapted to positioning a given limited number of sheathed fibers to be retained in said clamp, said top face of said support and the grooved face of said plate cooperating to constitute said grooved plane surface when said plate is installed in said recess.

The clamp may further have at least one of the following additional characteristics:
   said grooved plate is chosen from a set of plates which are grooved differently from one another, and which can be mounted interchangeably on said support;
   each plate has a fiber-retaining region in which each sheathed fiber is retained on the grooved face of the plate, said region interrupting each groove in the plate in question, and being situated facing said jaw when the law is in the closed position on the plate installed in said recess in the support;
   said jaw forms a flat cover which is hinged about a "rear" one of the edges of said support, and which has a plane inside face provided with a projecting elastically-deformable strip for pressing against the grooved face of the installed plate;
   said locking means are constituted by a resilient catch provided on the cover, the catch being snap-fastened under the front edge of the support by applying force;
   the unlocking means are constituted by a lever mounted on said support so as to pivot facing the snap-fastened catch;
   the cover is mounted either on the left-hand end portion of the support or on the right-hand end portion thereof, thereby defining a resulting left-hand clamp or a resulting right-hand clamp; and
   the plates are identified as a function of the fibers that they can receive and/or as a function of whether they are to be mounted in a left-hand clamp or in a right-hand clamp.

BRIEF DESCRIPTION OF THE DRAWINGS

The characteristics and advantages of the present invention appear from the following description of an embodiment given with reference to the accompanying drawings, in which.

MORE DETAILED DESCRIPTION

Figure 1:
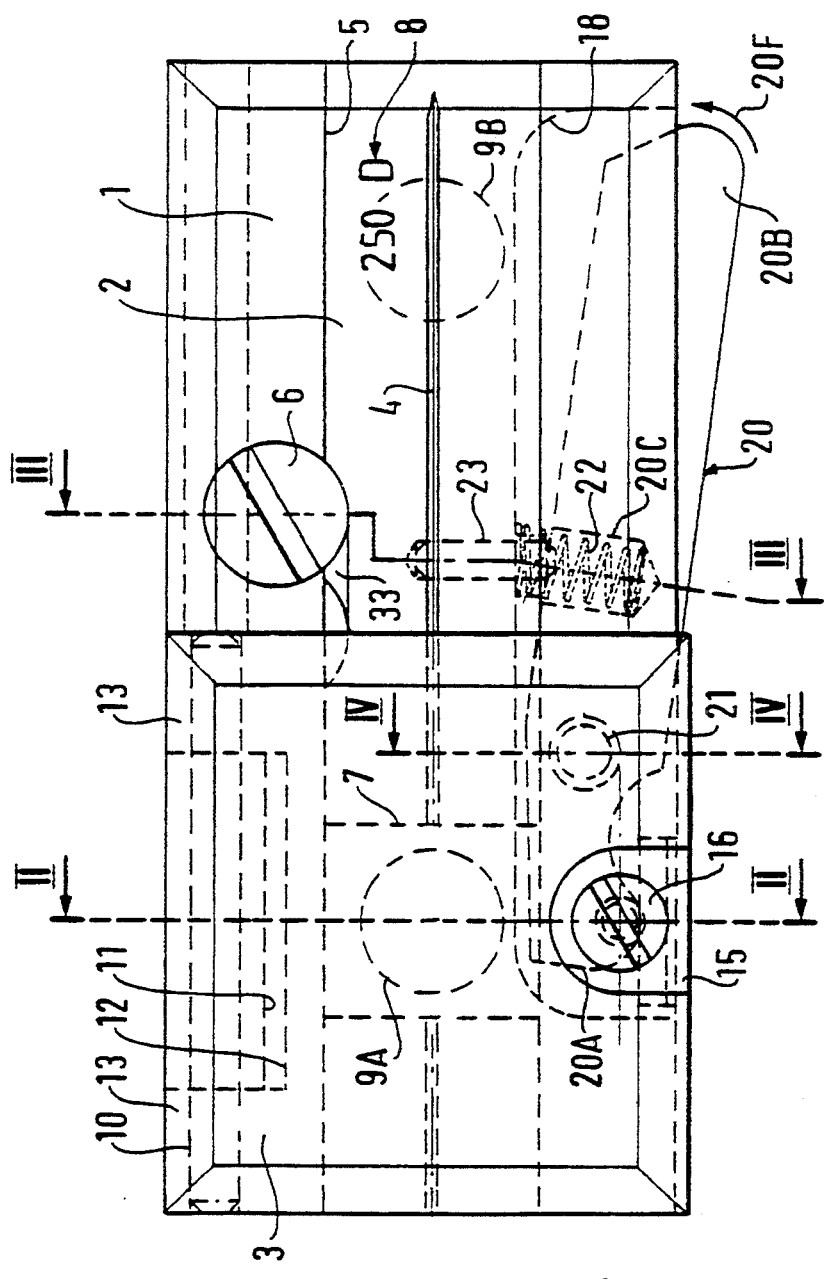
FIG. 1 is a plan view of a clamp of the invention, shown in the "closed" position.

The clamp shown in FIG. 1 is assigned to retaining a single sheathed optical fiber.

Figure 3:
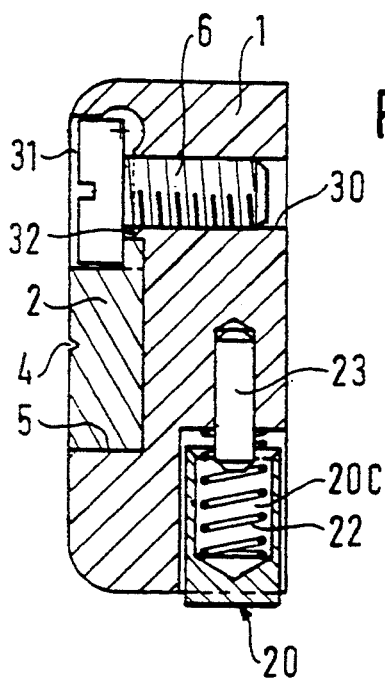

FIGS. 1 and 3 show that the clamp includes a relatively flat rectangular support 1, a grooved plate 2 removably mounted in the plane top face of the support 1, and a cover 3 that can be swung closed against the top face of the support 1 and against the top face of the plate 2. The cover 3 forms a clamping Jaw for clamping the sheathed optical fiber (not shown) installed on the grooved plate. The cover extends over the entire width of the support, but preferably only covers a portion of the length thereof. The covered portion is advantageously either one of the end portions of the support, the clamp then either being a left-hand clamp or a right-hand clamp when it is used on the left-hand side or the right-hand side of a work station. The clamp shown in the Figures is a right-hand clamp, having its cover 3 covering the left-hand end portion of the support 1. A corresponding left-hand clamp (not shown) is derived from the right-hand clamp by symmetry, and has its cover covering the right-hand end portion of the support.

The plate 2 has a V-shaped longitudinal groove 4 along the axis of its top face. The grooved top face of the plate installed on the support 1 fits flush with the top face of the support. The grooved top face of the plate enables a single sheathed fiber to be positioned on the support, the fiber being received in the groove 4 and remaining slightly proud relative to the plate and to the support, the plate thereby assigning the support to retaining said single fiber.

Figure 5:
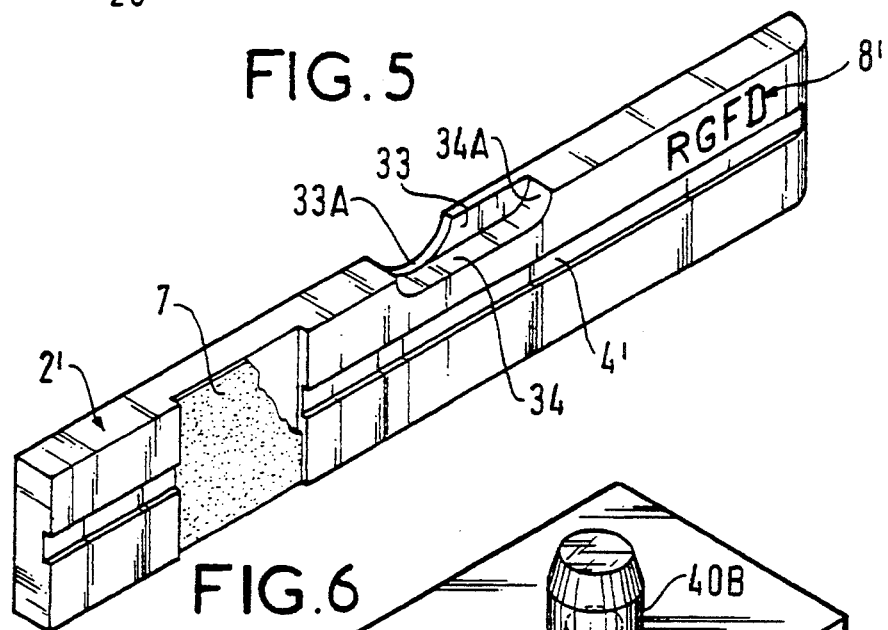
FIG. 5 is a perspective view of a guide plate for guiding optical fibers, which plate can be used to replace the plate installed in the FIG. 1 clamp.

The support 1 has a recess 5 in its top face, over its entire length, which recess receives the plate 2 or another similar plate, such as the plate 2' shown in FIG. 5. The right cross-section of the recess is in particular rectangular, and is the same as that of each of the plates, ignoring a small amount of clearance to enable any one of the plates to be installed in the recess in the support. The support, the plates, and the cover are preferably made of metal.

A screw 6 engaged in the support 1 retains the installed grooved plate. The screw enables the installed plate to be removed and to be replaced by another plate whenever necessary.

Only the differences between plate 2 and plate 2' shown in FIG. 5 are mentioned immediately below.

While the V-shaped groove 4 in plate 2 enables a single sheathed fiber to be positioned, plate 2' has a channel-section groove 4'. Groove 4' is assigned to positioning a defined number of sheathed fibers side-by-side, the width of the groove being chosen as a function of the number of the sheathed fibers and of the diameters thereof, so as to avoid any play for the fibers in the channel section. The fibers installed in the channel-section also remain slightly proud relative to the grooved top face of the plate 2'.

In a variant (not shown), another type of similar plate may have a plurality of parallel close-together V-shaped grooves for positioning as many individual sheathed fibers.

The dispositions that are identical in both plates are described with reference to plate 2, and are expressed by respective identical references in FIG. 5.

In a region 7 that is centered under the cover 3, plate 2 has a retaining element for retaining the installed sheathed fiber in the groove in the plate when the cover is closed. The retaining element is designated by the reference 7 of the region in question. The retaining element avoids any longitudinal slippage of the sheathed fiber when external force is exerted on the fiber. The retaining element is constituted by a friction pad which is set into the top face of the plate. The pad interrupts the groove 4 and extends either over the entire width of the plate or over a portion of the width thereof. It is flush with or slightly set back from the grooved top face, without causing any modification in the linear positioning of the sheathed fiber received in the groove and lying directly on the pad.

In a variant, the retention effect for retaining the sheathed fiber in the non-grooved region 7 may be obtained by performing local surface treatment so as to create fiber-retaining surface micro-roughness, so that the region itself then constitutes the retaining element directly.

Figure 2:
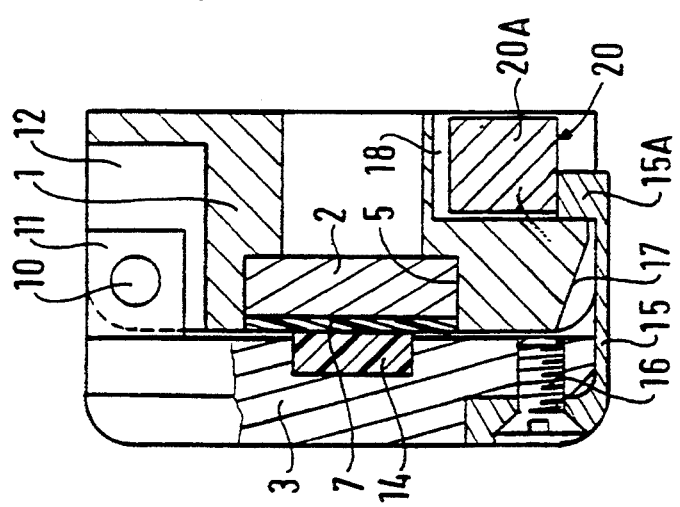
FIGS. 2 and 3 are section views through the clamp, respectively on line II—II and on line III—III in FIG. 1.

The cover 3 is pivotally mounted to rotate about a side pin 10 via which it is secured to the support 1. The pin is situated in the vicinity of the edge where the top face of the support meets the "rear" face thereof. The pin passes through a bored shoulder 11 provided under the rear edge of the cover and projecting under the inside face thereof. The shoulder 11 corresponds to a clearance window 12 in the rear face of the support. The hinge 11-12 makes it possible to obtain a "parallel" layout, in which the inside face of the cover 3 is parallel to the top face of the support 1 when the cover is in the closed position (FIG. 2), and a small amount of clearance is left therebetween. The two rear portions 13 of the cover, delimited on the inside face of the cover on either side of the shoulder 11, constitute two end-of-stroke stops for the opening stroke of the cover, by abutting against the rear face of the support. In this fully-opened position, in which the cover is opened to the maximum possible extent, the cover defines an angle that is very slightly greater than 90° relative to the support, and the cover remains stable in this open position.

The cover 3 is provided with an elastically-deformable middle strip 14 that is attached to or in part set into the inside face of the cover, and that projects slightly therefrom. When the cover is closed, the strip extends along the middle of the end portion of the support 1 equipped with the grooved plate. The strip is centered on the plate and entirely covers at least the groove in the installed plate 2 or in any other similar installed plate 2'. The strip presses resiliently against the sheathed fiber(s) installed in the groove in the plate, and contributes together with the retaining element 7 to the traction strength of each sheathed fiber when the cover is closed.

The cover 3 is further locked closed by a catch 15 secured to the front edge of the cover by a screw 16. The hooked end 15A of the catch is resiliently snap-fastened under the front edge of the support 1. The support 1 has a corresponding sloping ramp 17 formed on the front face thereof, for guiding the end 15A of the catch to a locking housing 18 provided in the bottom face of the support and open to the front edge thereof. When the cover is already closed against the support 1, the cover is locked closed directly merely by pressing against the front portion of the outside face of the cover.

Figure 4:
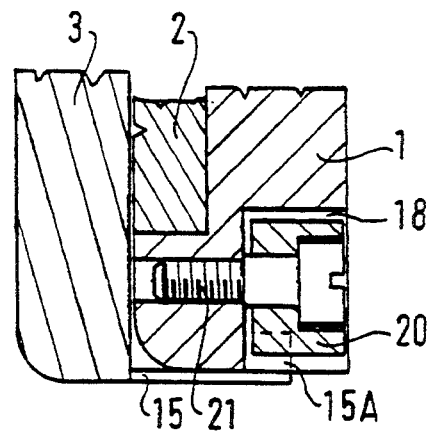
FIG. 4 is a fragmentary other section view through the clamp on line IV—IV in FIG. 1.

Unlocking means 20 for unlocking the closing catch 15 are mounted in the housing 18 which, for this purpose, extends over almost the entire length of the bottom face of the support. The unlocking means 20 are constituted by a lever pivotally mounted parallel to the support 1 in said housing 18. The hinge pin 21 of the lever is defined by a screw which passes freely therethrough and which engages in the thickness of the support 1 (FIG. 4). The screw is at a relatively short distance from the end 20A of the lever, which end faces the catch so as to unlock it when the lever is operated.

The lever 20 is urged towards the inactive rest position, in which the end 20A of the lever is not in contact with the end 15A of the catch, by a spring 22 working in compression. The spring is mounted to bear against the lever and the vertical edge of the housing 18. The spring is situated between the pin 21 and the second end 20B of the lever. A cavity 20C is provided in the inside edge of the lever, so that the spring continues to bear against the lever. A corresponding peg 23 mounted in the support 1 and projecting from the vertical edge of the housing 18 ensures that the spring continues to bear against said vertical edge (FIG. 3). In the rest position, the end 20B of the lever projects relative to the front of the support 1. By operating the lever in the direction of arrow 20F, the lever is put into the active position, in which the end 20A pushes the end 15A of the catch out of the housing, and releases the cover, so that it can by opened fully by hand.

Retaining the plate 2 in the support 1 is described with reference to FIGS. 1 and 3, and also with reference to FIG. 5, solely with respect to the respective dispositions that are identical on both plates 2 and 2'. The plate is retained on one side by means of the screw 6 locking against a "rear" one of the edges of the installed plate, rather than the plate being retained centrally at the groove 4 or 4', so as to avoid any danger of damaging the groove and of subsequently positioning the fiber(s) incorrectly in the groove.

For this purpose, the rear portion of the support 1 is provided with a tapped hole 30 close to the recess 5 and extended by an end housing 31 for the screw head. The housing 31 opens out on the top face of the support, and truncates the height of the edge 32 of the recess, so as to extend in part into the recess in the absence of the plate. The rear edge of the plate is provided with a corresponding recess over a portion of the height of the plate and of the length thereof, in a nearly-middle region. The recessed rear edge of the plate defines firstly a bottom flat 33 having the same height as the truncated edge 32, which flat serves as an abutment for the screw head, and secondly a vertical edge 34 that is set back to provide the necessary clearance for the screw head. At one end of the flat, the vertical edge 34 forms a circularly-arcuate terminal transition 34A matching the outline of the screw head when the plate is installed and retained. At the opposite end, a hole 33A is provided through the flat to facilitate manufacturing.

A set of differently-grooved plates such as 2 and 2' is therefore associated with the same support of the right-hand clamp. Another set of plates that are symmetrical to plates 2 and 2' is likewise associated with a left-hand clamp. Each of the plates is identified by inscriptions represented at 8 or 8', expressing the diameter of the single fiber, or the number and optionally the diameters of the multiple fibers that can be received in the groove in the plate. One of the inscriptions (in this case the letter D, or in a variant the letter G) expresses that the plate in question is to be used in a right-hand clamp, or, in a variant, in a left-hand clamp. The inscriptions are preferably made on that one of the ends of the grooved face of the plate which is not covered by the cover of the resulting clamp.

FIG. 1 further shows that the support 1 also has two holes 9A and 9B, or other analogous means provided in its bottom face, for mounting the resulting clamp on a work station that is provided with complementary means. The holes are centered on the middle longitudinal axis of the bottom face of the support. Preferably, each hole is at a different distance from that end of the support (right-hand end or left-hand end) which is nearer the hole in question, or else the holes have different cross-sections, so that the support is keyed into the correct position relative to an abutment, or respective abutments, provided on the work station for one end (right-hand or left-hand) or for both ends of the support.

Figure 6:
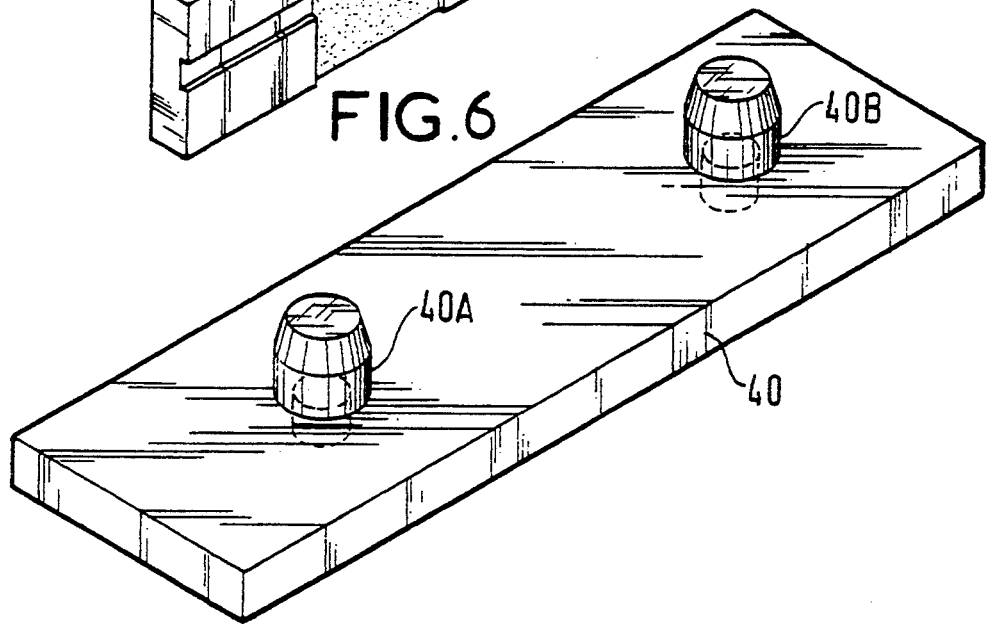
FIG. 6 shows the base of a work station in equipment using the clamp.

FIG. 6 shows a base 40 of a work station in a machine or equipment using the clamp. Preferably, the base is made of metal and is magnetized. The base has two fingers 40A, 40B projecting from its top face, or means that are complementary to those provided on the bottom face of the clamp, so that the clamp can be mounted correctly on the base. The clamp is held in place by the action of the magnetized base retaining the metal support of the clamp. Naturally, the clamp may be held in place differently, and in particular by mechanical means.

We claim:

1. A clamp for retaining at least one optical fiber, said clamp including a body, a grooved plane surface on said body for positioning each sheathed optical fiber, a clamping jaw pivotally mounted on said body parallel to each groove to pivot between an open position relative to said grooved plane surface and a closed position against said grooved plane surface, locking means for locking said jaw in the closed position, and associated unlocking means, wherein said body is formed by a relatively elongate "flat" support having a top plane face provided with a recess, and by a plate which is complementary to said recess, which is removably installed in said recess, and which has at least one groove on a face thereof which fits flush with said top face of said support, which adapted to positioning a given limited number of sheathed fibers to be retained in said clamp, said top face of said support and the grooved face of said plate co-operating to constitute said grooved plane surface when said plate is installed in said recess.

2. A clamp according to claim 1, wherein said grooved plate is chosen from a set of plates which are grooved differently from one another, and which are interchangeably installable on said support.

3. A clamp according to claim 2, wherein each plate has a fiber-retaining region in which each sheathed fiber is retained on the grooved face of the plate, said region interrupting each groove in the plate, and being situated facing said jaw when the jaw is in the closed position on the plate installed in said recess in the support.

4. A clamp according to claim 1, wherein said jaw forms a flat cover which is hinged about a "rear" one of two opposite edges of said support, and which has a plane inside face provided with a projecting elastically-deformable strip for pressing against the grooved face of the installed plate.

5. A clamp according to claim 4, wherein a width of said cover is substantially the same as a width of said support, and wherein said locking means are constituted by a resilient catch provided on the "front" edge of said cover opposite from the rear edge thereof, one end of the catch being snap-fastened under the corresponding front edge of said support by exerting pressure on the cover when it is in the closed position but is not locked.

6. A clamp according to claim 5, wherein said unlocking means are constituted by a lever secured to said support to pivot facing said catch parallel to the top face and an opposite bottom face of said support.

7. A clamp according to claim 6, wherein the bottom face of said support is recessed to define a front bottom housing both for said lever and for the snap-fastened end of said catch.

8. A clamp according to claim 4, wherein said cover is shorter than said support and than the installed plate, and is hinged either at a left-hand end portion or at a right-hand end portion of the rear edge of the support, thereby respectively defining a resulting left-hand clamp or a resulting right-hand clamp.

9. A clamp according to claim 1, including side retaining means for retaining the installed plate, which side retaining means are constituted by a screw engaged in said support in a vicinity of said recess, which screw has an end head received both on a adjoining edge of said recess, which edge is truncated level with the screw, and also on an abutment flat provided on a corresponding rear face of the plate.

10. A clamp according to claim 1, further including, in a bottom face of the support, mounting means for mounting the support on a base of a work station, which base is in turn provided with complementary mounting means.

11. A clamp according to claim 10, wherein means for holding the clamp in place on said base are provided at least on the base.

12. A clamp according to claim 11, wherein the clamp is metal and said base is magnetized, thereby defining said means for holding said clamp in place.

13. A clamp according to claim 2, wherein each plate carries identification means defining the number and diameters of sheathed fibers that it can receive.

14. A clamp according to claim 8, wherein the plate carries identification means defining whether it is to be installed in a right-hand clamp or a left-hand clamp.

* * * * *